Fig. 1.

No. 693,184.   
A. SUNDH.   
Patented Feb. 11, 1902.

ELECTROPNEUMATIC CONTROL SYSTEM FOR ELEVATORS.

(Application filed Sept. 20, 1901.)

(No Model.)

Witnesses
Inventor
August Sundh
By
Attorneys

THE NORRIS PETERS CO., PHOTO-LITHO., WASHINGTON, D. C.

UNITED STATES PATENT OFFICE.

AUGUST SUNDH, OF YONKERS, NEW YORK, ASSIGNOR TO OTIS ELEVATOR COMPANY, OF EAST ORANGE, NEW JERSEY, A CORPORATION OF NEW JERSEY.

ELECTROPNEUMATIC CONTROL SYSTEM FOR ELEVATORS.

SPECIFICATION forming part of Letters Patent No. 693,184, dated February 11, 1902

Application filed September 20, 1901. Serial No. 76,126. (No model.)

*To all whom it may concern:*

Be it known that I, AUGUST SUNDH, a citizen of the United States, residing in the city of Yonkers, county of Westchester, and State of New York, have invented certain new and useful Improvements in Electropneumatic Control Systems for Elevators, of which the following is a specification.

My invention relates to the operation and control of elevators; and one of its objects is to obviate the necessity of extending electrical connections to the car or cage and throughout the vicinity of the travel of the car, as in the elevator-well and hallways. In an electric elevator using high potential great precautions are necessary for the protection of the connections to avoid danger to the operator and users, and in the ordinary systems of electrical control the switches and apparatus about the car and elevator-well consume space for installation which it is not always convenient to provide.

My invention consists, primarily, in providing pneumatic connections between the car and floors or stations and the controlling apparatus proper of the motor, thus doing away with the necessity of extending electrical connections to the car and stations; and it also consists in providing mechanical connections operated by the well-doors, instead of electrical connections, as heretofore, whereby the controlling-circuits are broken whenever the well-doors (or any one of them) are open.

My invention also consists in a form of floor-controller designed to do away with much arcing between the contacts and provided with regulating means for adjusting the parts in order that the car may be brought to a stop substantially on a level with the floor.

My invention is more fully set forth in the specification and is illustrated in its many details in the accompanying drawings, in which—

Figure 1:
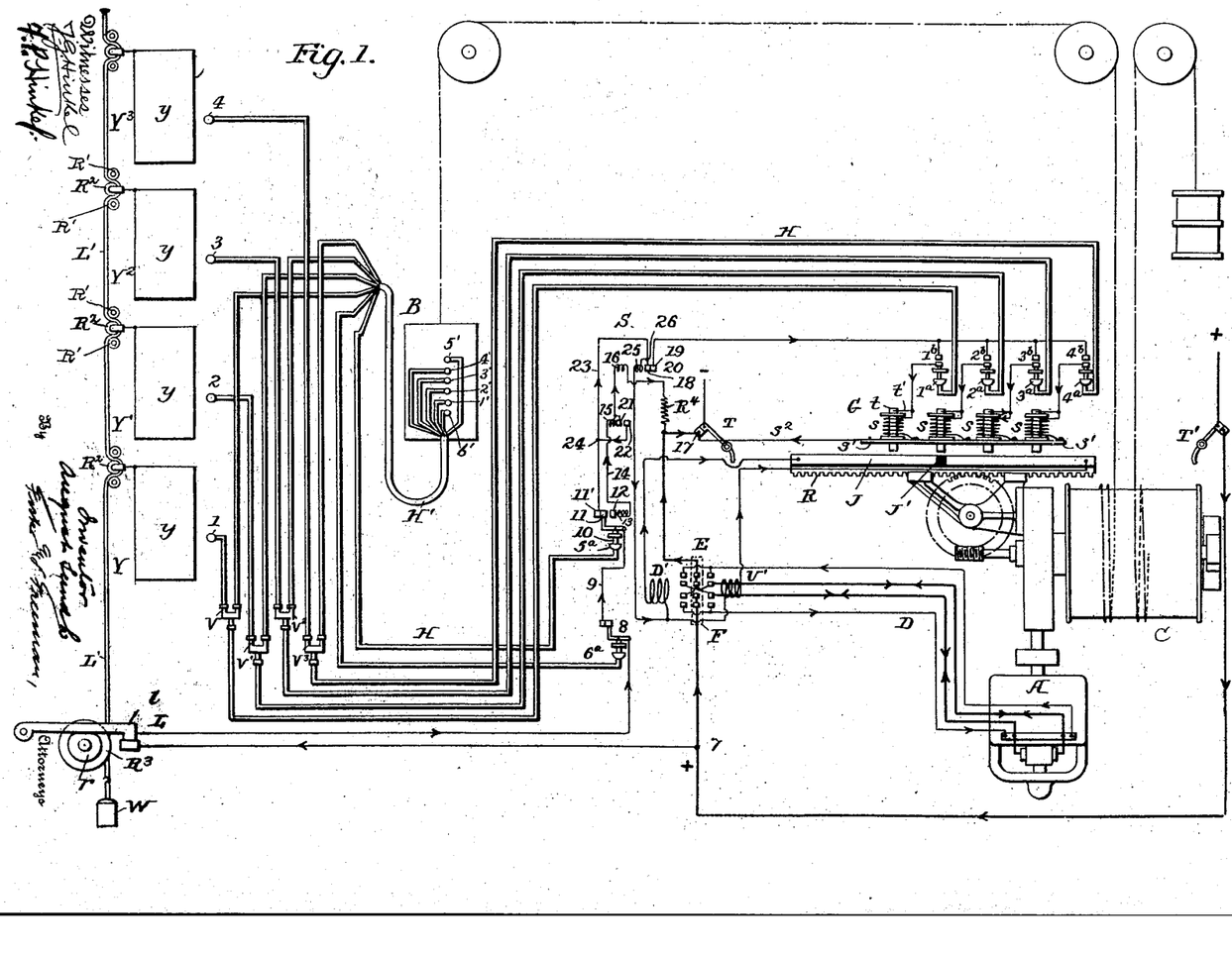
Figure 1 is a diagrammatic view of apparatus embodying my invention.

Referring to the drawings, A represents a motor, shown as an electric motor, and B represents an elevator car or cage connected to a drum C, operated from the motor by any suitable connections.

Y Y' Y$^2$ Y$^3$ represent floors or stations, of which there may be any number, each being provided with a door $y$, opening, as usual, upon the elevator-well.

In order to operate the motor and to control its direction of rotation for moving the car upward or downward, starting and reversing electrical connections D are shown; but they may be of any suitable character, and being no part of my invention need not be further described. Connections are made between the motor and a reversing-switch E, which may also be of any convenient character, but is preferably of that form described in application for Letters Patent, Serial No. 660,873, filed December 6, 1897, and entitled "Electrical operation of elevators by a single push-button system." In this type of reversing-switch an armature F, carrying contacts, is adapted to be swung to one side or the other of the center and close the proper circuits for the operation of the motor in one direction or the other, the armature F being actuated by suitable electromagnets or relays D' U', the arrangement being such in this instance that when relay D' is energized it will attract the armature F and so connect the field and armature of the motor A to the supply-mains that rotation will take place in a direction for moving the car B downward, while if the relay U' is energized the motor will rotate in such a direction as to move the car upward, and this rotation in one direction or the other will continue as long as one or the other of the relays remains energized.

In order that the circuit may be broken at the proper time for the car to stop at the desired floor or station, the controlling-circuits include a floor controller or controlling device G, included in the controlling-circuits of the motor and of a particular construction hereinafter to be described.

Figure 5:
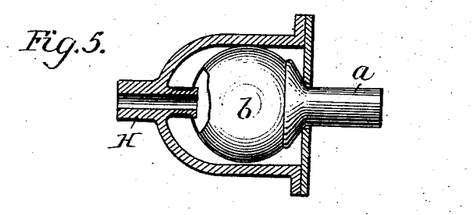
Fig. 5 is a view, partly in section, of a pneumatic push-button.
Figure 6:
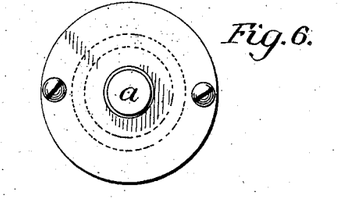
Fig. 6 is an end view thereof.

The motor and its controlling circuits and devices are controlled by pneumatic means. At each floor or station $Y\ Y'\ Y^2\ Y^3$ are shown pneumatic push-buttons 1 2 3 4, and pneumatic push-buttons $1'\ 2'\ 3'\ 4'$ are shown on the car, while pneumatic connections are made between the push-buttons at the stations and on the car and the motor-controlling devices, these pneumatic connections being shown in this instance as consisting of tubes H, made of any suitable material, but preferably connected in a cable H' and made flexible in that portion of the connections between the car and the landings. Other pneumatic push-buttons $5'$ and $6'$ are shown on the car and also connected to parts of the controlling apparatus of the motor, the function of these buttons being hereinafter set forth. The construction of these pneumatic push-buttons is no part of my invention, and I have merely shown by way of illustration a suitable form of push-button. (Illustrated in detail in Figs. 5 and 6.) A knob $a$ is shown connected to a suitable bulb $b$, fitting with an air-tight joint to one of the tubes H, so that pressure upon the knob $a$ will cause an impulse of air or vibration to pass through the tube, this impulse being utilized to actuate a diaphragm or other suitable pneumatic device in the tube, illustrated as a diaphragm or bulb $c$, Fig. 4, to which is shown connected a stem $d$, sliding in a fixed part $e$, against which abuts a spring $e'$, tending to hold the stem against the diaphragm, so that an impulse of air passing through the tube from the pneumatic button will cause the diaphragm or bulb $c$ to move outward and press outward the stem $d$. By then providing a switch with one of its contacts on the stem an arrangement is produced suitable for controlling an electric circuit from a distance.

Figures 7, 11:
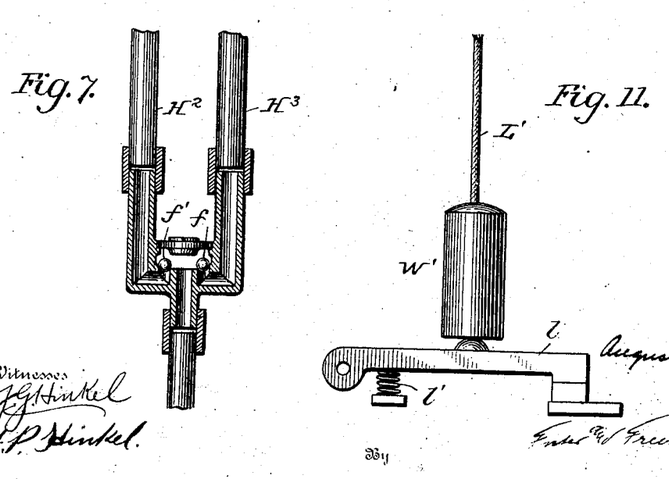
Fig. 7 is a view, partly in section, showing valves in the pneumatic connections.
Fig. 11 illustrates a modification of mechanical means for breaking the controlling-circuits.

In order that an impulse may pass through the pneumatic connections to its desired destination without escaping through those connections to a floor or station button—for instance, if a button on the car has been operated, and vice versa—means are provided at suitable points, as the points $V\ V'\ V^2\ V^3$, where the tubing is shown as branching, one branch in each case going to the car and the other to a floor or station. As shown in Fig. 7, suitable valves are provided at these points, so that an impulse passing through the tube $H^2$ would lift the valve $f'$ and pass onward to its destination and would be prevented from passing through tube $H^3$ by means of a valve $f$.

The button $5'$ on the car operates a suitable diaphragm or bulb $5^a$, arranged in connection with the motor-controlling circuits and devices, and this button $5'$ may be called the "safety-button," since by operating it what will hereinafter be termed the "safety-circuit" is controlled, while the button $6'$ on the car controls a bulb or diaphragm $6^a$, and this may be called the "stop-button," since its function is to break the controlling-circuit in case of emergency and stop the motor, and thus the car.

Those points on the diaphragm indicated by the plus and minus signs represent the positive and negative mains supplying current to the motor and to the controlling-circuits, and what I have termed my "safety-circuit" may be traced as follows: Starting from the point 7 on the positive main, connection is made through a switch L, whose function will hereinafter be referred to, and from thence connection is made to a circuit-breaking switch 8, controlled by the pneumatic bulb $6^a$. From thence the circuit passes by a wire 9 to a suitable switch controlled by a conductive connection or stem 10, actuated by the pneumatic device $5^a$, thence through the normally open switch or contacts 11 12, through an electromagnet 13 by wire 14, through an electromagnet 15, through one winding 16 of what I term my "safety-magnet" S, and thence through a suitable balancing resistance $R^4$ to the negative main at point 17. The resistance $R^4$ is to prevent too much current passing through the safety-circuit.

Figures 2, 3, 4:
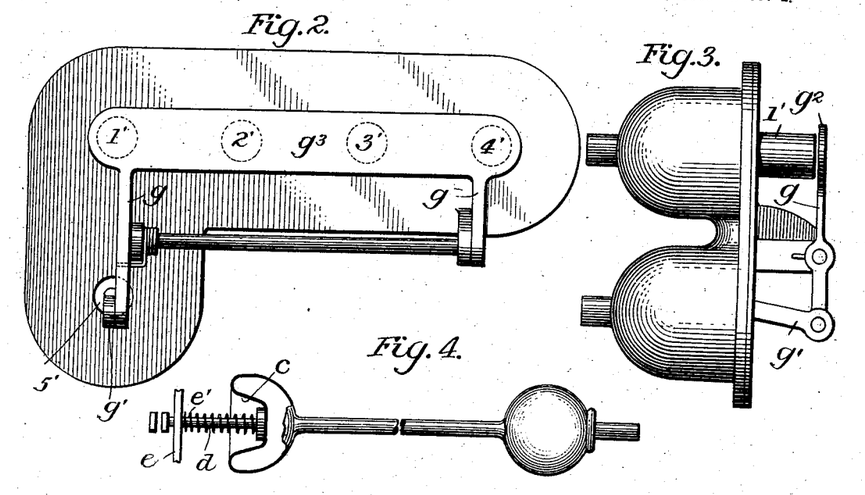
Fig. 2 is a plan view of the mechanical construction of the car push-buttons.
Fig. 3 is an end view thereof.
Fig. 4 is illustrative of pneumatic means for operating a switch.

By any suitable mechanical connection, as shown in Figs. 2 and 3, the push-buttons $1'\ 2'\ 3'\ 4'\ 5'$ on the car are so arranged that the safety-button $5'$ is always operated in advance of any one of the other buttons on the car, so that the safety-circuit must first be closed before any of the other controlling-circuits are closed. As shown, a pivoted lever $g$ is connected at one side to an arm $g'$, adapted to force the safety-button $5'$ inward or compress it, and thus send an impulse through the pneumatic connections whenever the outer end $g^2$ of said lever is lifted, and it will be seen that the lever must be lifted in order that its broad portion $g^3$ may uncover the other push-buttons on the car before any one of them can be operated.

By operating the safety-button $5'$, assuming that switches L and 8 are closed, the impulse generated will actuate the pneumatic diaphragm or device $5^a$, which, as has been stated, may be of that form shown in Fig. 4 at $c$, so that the stem 10, to which is connected one contact, as 11, will be actuated to close contact between 11 and 12 and to break contact between the normally closed contacts 11 and $11'$, hereinafter to be referred to. The safety-circuit is now completed, as described, and electromagnets 13 15 and the coil 16 of safety-magnet S will be energized. Coil 16 of magnet S has not, however, sufficient power to separate contacts 18 19 of the normally closed switch 20, but magnet 15 will close the normally open switch or contacts 21 22, thereby completing a connection from one contact 22 to a branch or parallel circuit 23 at the point 24.

On the floor-controller G are shown pneumatic devices, as diaphragms or bulbs $1^a$ $2^a$ $3^a$ $4^a$, corresponding to the buttons $1'$, &c., and so arranged that when an impulse is sent through one of the pneumatic connections connecting with these bulbs one of the normally open switches $1^b$ $2^b$ $3^b$ $4^b$ is operated. In circuit with each one of the switches $1^b$, &c., are electroreceptive devices, as solenoids $s$, forming controlling magnets or devices, each solenoid being connected to a suitable conductor $s'$, connecting by wire $s^2$ to the negative main at 17.

When the safety-button $5'$ has been operated to close the safety-circuit, as described, a button $1'$ on the car may be pressed, which will close the switch $1^b$ and complete a circuit in parallel with the safety-circuit, including the normally closed switch 20, normally open switch $1^b$, and a solenoid $s$. Each solenoid is arranged with a movable core $t$, normally out of contact with a movable contact J, but adapted to be moved into electrical connection with said movable contact J in a direction substantially perpendicular thereto when the solenoid is energized. When a core is moved into contact with the movable contact J, a parallel circuit will be closed, starting from the point 26 and passing through a winding 25 on a safety-magnet S, thence through one or the other of the relays D' U' to the movable contact J, and thence through a core $t$ and by a connection $t'$ to the solenoid and to the line. This movable contact J is connected with the moving part of the apparatus, as by means of a rack and pinion and worm and wheel with the shaft of the sheave, and the travel of the movable contact is proportioned to the travel of the car.

The movable contact J is shown as having an insulated portion J', which portion is adapted to come in contact with one of the cores $t$ and breaks contact at the appropriate moment when the elevator-car has reached its destination. While the travel of the movable contact J, as stated, is proportioned to the travel of the car, the distance between the cores $t$ must also be so arranged that the car is traveling between two stations during the time that the insulated portion J' is moving between any two adjacent cores $t$.

Assuming that the parts are in the relative position shown in the diagram in Fig. 1, with the car at the second station or second story and at rest, and the insulated portion J' of the movable contact J is adjacent to the solenoid $s$, corresponding to switch $2^b$ and to buttons 2 and $2'$, let it be supposed that an operator in the car desires to bring the car to the first floor or station, and provided that switches L and 8 are closed and all of the doors of the well are closed, the operator upon first sending an impulse through the pneumatic connections by means of button $5'$ on the car will close the safety-circuit, as hereinbefore described. Then upon pressing button $1'$ of the car switch $1^b$ will be actuated to close the contacts thereof and a circuit in parallel to the safety-circuit will be closed, starting from contacts 21 22 and including the contacts of switch 20, the contacts of switch $1^b$, the solenoid $s$ corresponding to station 1 and through connection $s^2$ to line at the point 17. The solenoid $s$ thereby energized will cause its armature $t$ to impinge upon the movable contact J, thereby closing a circuit including relay D', as hereinbefore described, starting from the point 26 and including one winding 25 of the safety-magnet S. Relay D' will connect the motor-circuits by means of the switch E in such manner that rotation of the motor will take place to move the car downward. When the car has reached the first floor or station, contact J having been moving at the same time to the left, the insulated portion J' will have arrived in contact with the core $t$ of the solenoid $s$, corresponding to switch $1^b$, whereby the circuit of the relay D' will be broken and the motor stopped.

It will be seen that when the safety-circuit is completed the weaker winding 16 of the safety-magnet S is energized, and when the circuit of one of the relays, as D', was completed the stronger winding 25 of the safety-magnet S was also energized. The winding 25 is of sufficient strength to separate contacts 18 and 19 of normally closed switch 20, and it will be seen that by breaking the circuit of the switches $1^b$, &c., at this point interference with the operation of the motor from a station or landing is effectually prevented, since even though one of the switches $1^b$, &c., should be actuated a controlling device or solenoid $s$ would not therefore be energized to affect one of the relays D' U'.

When the circuit of a relay D' U' is automatically broken to stop the motor, the winding 25 of safety-magnet S would necessarily be deënergized; but the winding 16 remains energized, since the safety-circuit remains energized after the motor has come to rest or the car has reached its destination, and this winding 16 is of sufficient strength to maintain contacts 18 19 of switch 20 separated until the safety-circuit is broken by some appropriate means, as by operating the stop-button $6'$ or by operating the switch L. Since, therefore, switch 20 is maintained open after the car has reached its destination, after the motor has been operated from the car the car is still under the control of the operator, and its movement cannot be interfered with from a floor or station until the safety-circuit has been broken and again made, thereby restoring the parts to their normal positions, in readiness to be operated from either car or stations.

With the parts in their normal conditions contacts 11 and $11'$ are normally closed and connection is made between these contacts and the point 24. This arrangement is provided for the control of the motor from the floors or stations, and when a floor or station push-button is operated the safety-circuit, as hereinbefore described, is not completed, but current passes from the point 7 on the positive main direct to contacts 11 11', from thence to the point 24, through switch 20, through one of the switches $1^b$, &c., energizing a solenoid $s$, and thereby operating one of the cores $t$ to close a circuit through one of the relays D' U', at the same time energizing the winding 25 of safety-magnet S. The motor will be then operated to cause the car to travel in the desired direction and to be automatically stopped, as before described. The winding 25 being energized, it causes magnet S to separate the contacts 18 19 of the normally closed switch 20, thereby effectually preventing interference with the operation of the car during its travel; but since the safety-circuit is not energized in this case, therefore after the relay-circuit is broken contacts 18 and 19 will resume their normally closed positions, and the motor and car may again be controlled from either the car or stations.

Limit-switches T T' are shown adapted to break the circuit at the supply-mains or at other suitable parts of the controlling-circuits in case the automatic controller should fail to operate or in any case of emergency wherein the motor should continue to operate and cause the car to overrun its travel. In this case the movable contact J is adapted to strike one of the switches T T', should its movement be continued beyond the normal, and break the circuit and stop the motor. A convenient arrangement for this operation is as shown, wherein the limit-switches T T' are arranged at each side of the movable contact J.

Figures 8, 9, 10:
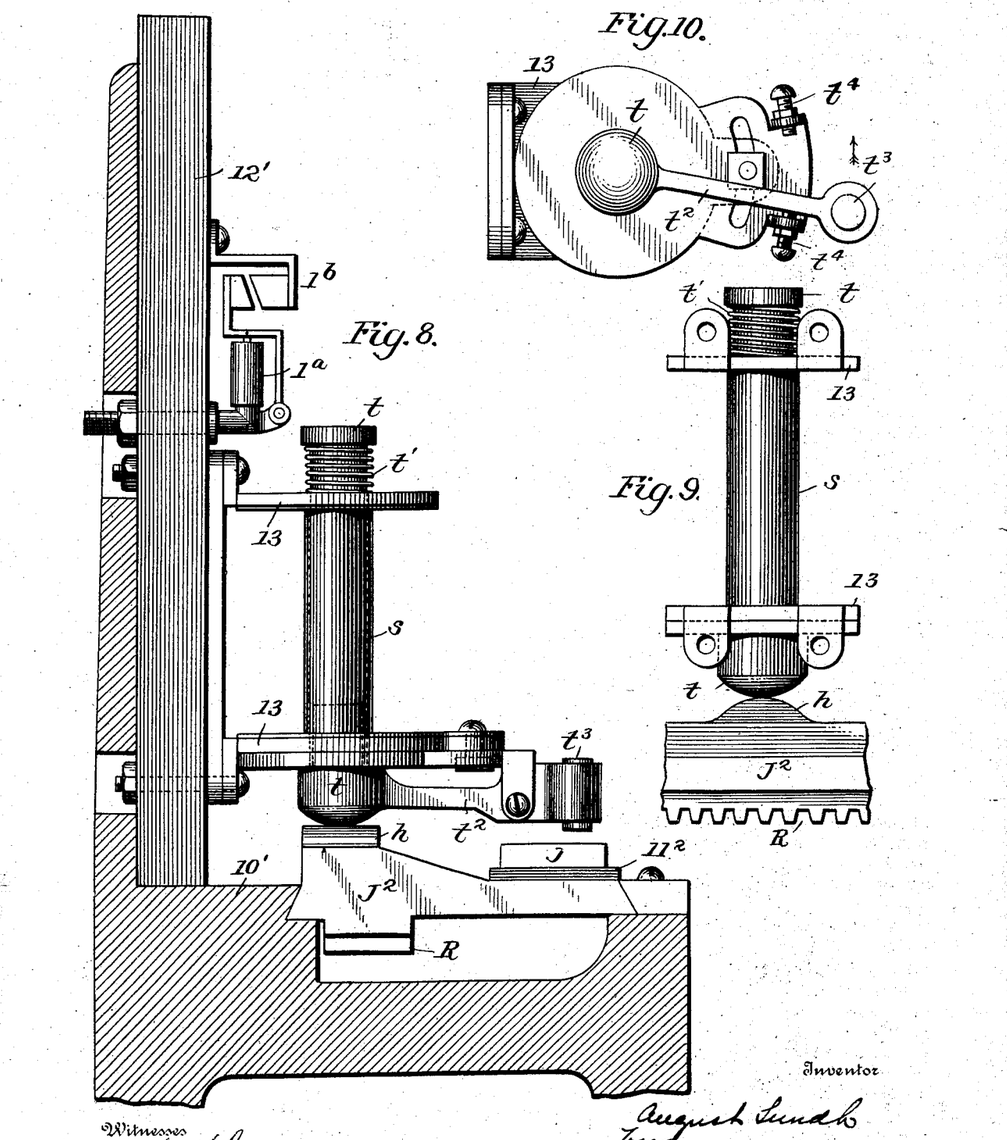
Fig. 8 is an end view, partly in section, of the floor-controller.
Fig. 9 is a side view of a detail thereof.
Fig. 10 is a bottom plan view of another detail thereof.

As shown in Figs. 8, 9, and 10, my floor-controller consists, substantially, of a suitable carrier $J^2$, arranged to slide on a suitable base 10' and supporting a contact-piece J, insulated therefrom by insulation $11^2$. An insulating-support 12' supports the switches $1^b$, &c., and the pneumatic controlling-bulbs $1^a$, &c. Also supported thereon on suitable arms 13 are shown solenoids $s$, having cores $t$, normally retracted by springs $t'$ or other suitable retracting means. The cores $t$ have projections $t^2$, carrying contacts $t^3$, which contacts are adapted to impinge upon the contact-piece J and make electrical connection therewith. In Figs. 8 and 9 the cores $t$ are shown in engagement with hubs $h$ on the carrier $J^2$, and in the arrangement of parts as assembled it will be seen that when the cores $t$ are in engagement with the hubs $h$ the contacts $t^3$ will be withdrawn from the contact-piece J. Retracting means or springs $t'$ also tend to keep the contacts $t^3$ out of contact with piece J.

The carrier $J^2$ is actuated, as described, from some movable part of the apparatus by means of a rack R, and as soon as the motor has started and has moved the hubs out of engagement with the cores $t$ an electromagnet $s$ may attract its core $t$ and cause a contact $t^3$ to impinge upon contact-piece J, thus completing a circuit including one of the relays D' U'. As carrier $J^2$ and its contact-piece J are moved to one side or the other during the operation of the motor the insulated portion J' of the contact-piece will break contact with one of the pieces $t^3$, thus deënergizing a solenoid $s$, which, it will be seen by reference to Fig. 1, has been maintained energized after the switches $1^b$, &c., were cut out of circuit by the operation of the safety-magnet S and switch 20. The deënergizing of the solenoid $s$ allows the retracting-spring $t'$ to withdraw contact $t^3$ from contact-piece J. The hubs $h$ may therefore be termed auxiliary means connected with the contact J for breaking contact, since their function is to raise the core $t$ at the time that the insulated portion J' comes into engagement with a contact $t^3$. In case a spring $t'$ should fail to operate or in case sticking should occur between the contacts or if a conducting-film should appear on the insulated portion J', thus prolonging the contact, a hub $h$ will raise the core $t$ in any event.

It is often a difficult matter to so adjust the parts of the floor controller that contact will be broken and the motor stopped at just the right point to bring the car to a stop on a level with the floor, and it will be readily seen that unless the adjustment of the parts of the floor-controller is exact, or, in other words, unless the length of time that the operating-circuits of the motor are maintained closed is nicely arranged to correspond to the length of time it takes a car to travel between stations, the car may stop a little above or a little below a floor or station. In the form of controller herein described it is furthermore necessary that the insulated portion J' of contact-piece J should be slightly wider than the contact $t^3$ in order that the circuit may be completely broken. Consequently there is a certain amount of time required for a contact $t^3$ to cross the insulated portion J', which must be allowed for in adjusting the parts, and in the arrangement shown in diagram in Fig. 1 there is no way provided for regulating the time that a contact $t^3$ makes electrical connection with contact-piece J. In order that this adjustment may be provided for, each contact $t^3$ is arranged to swing laterally, as shown in Fig. 10. It will be seen that arms $t^2$, connected to the cores $t$, have a certain amount of lateral play between stops $t^4$, and assuming that the contact-piece J is moving in the direction of the arrow in Fig. 10 during a portion of that movement, since arm $t^2$ is lightly pivoted in connection with the core $t$, the contact-piece $t^3$ will have no movement relative to contact J and will not slide thereon, but will move therewith, owing to friction between the surfaces. Since there is a definite portion of contact-piece J over which a contact $t^3$ must slide before contact is broken by the insulated portion J', and this sliding contact will consume a certain length of time, it will be seen that if for a portion of the movement $t^3$ and J move together the time during which they are in contact may be prolonged. The time during which the contact J and contact-piece $t^3$ move together may be regulated from zero to a maximum by means of the regulating-screws $t^4$, and thus the breaking of the circuit may be nicely timed to allow for any lost motion of the parts and to bring the car to a stop substantially on a level with the floor.

Instead of extending the controlling-circuits through contacts controlled by the well-doors, as customary, so that when a door is opened the controlling-circuit is broken in order to avoid the use of wires carrying heavy current throughout the building for this purpose I provide an arrangement whereby the controlling-circuit is always broken, through the operation of mechanical means only, upon the opening of a door. The switch L is arranged for this purpose in suitable position, in this instance shown as being at the bottom of the well, and while different mechanical connections may be readily provided for operating the switch L by means of the doors one suitable form is shown in Fig. 1. A cable or rope L' is suspended from the top of the well and is held taut by a weight W or other means and passes adjacent to the doors. Sheaves R' are provided at the stations, between which the rope or cable L' is adapted to sag or bulge. Between each pair of sheaves R' is arranged a sheave $R^2$, connected in any suitable manner with the door and engaging the rope L', so that when a door is opened the rope is caused to extend still farther between the sheaves, thereby shortening, and thus providing means for actuating the switch L. In this instance the turn of the rope is taken around a sheave $R^3$, provided with a cam $r$, upon which rests a lever $l$ of the switch L, and any shortening of the rope caused by the opening of a well-door will rotate the sheave $R^3$ and cam $r$, thus raising the lever $l$ and opening the contacts of the switch. A modification of this arrangement for mechanically breaking the controlling-circuit by the operation of the well-doors is shown in Fig. 11, in which a weight W' at the end of the rope L' is adapted to rest upon the lever $l$ and keep the contacts of the switch L closed, while a spring $l'$ tends to open them. Whenever the weight W', therefore, is lifted, the contacts of the switch are open and the controlling-circuit broken.

My invention comprises a pneumatically-controlled electric motor for operating a car or cage, and in carrying out my invention I provide pneumatic means connected to the car and stations and controlling the controlling circuits and devices of the motor, which include relays, a reversing-switch, a floor-controller and its operating parts, and various electroreceptive devices and contacts forming the complete motor-controlling means. Pneumatic push-buttons are provided for the floors or stations, while there are pneumatic push-buttons on the car corresponding to the several floors or stations, and the pneumatic connections include the push-buttons and the controlling devices of the motor.

A set of pneumatic push-buttons are shown for the floors or stations, and another set of pneumatic push-buttons are arranged on the car, the buttons on the car corresponding to the several floors or stations, while the pneumatic connections include the push-buttons and the controlling devices of the motor, and means are provided for preventing the subsequent control of the motor from one set of push-buttons after it has been operated from the other set.

The pneumatic controlling connections and controlling devices of the motor are so arranged that when any push-button is operated the controlling-circuits are completed and the motor operated to bring the car to the station corresponding to the push-button, and there can be no interference with the operation of the motor after it is started.

It will be seen that in my apparatus there are pneumatic devices and connections provided for calling and sending the car from one station to another, operating in conjunction with electrical means for controlling the operation of the motor. The car may be called by the operation of the pneumatic device at a station, and it may be sent to a station by the operation of a device in the car.

Pneumatic devices, as push-buttons, are arranged at the floors or stations, and there are pneumatic devices on the car corresponding to the floors or stations, with pneumatic connections, as tubes, connecting the devices on the car with the corresponding devices at the stations, while common pneumatic tubes or connections lead to the means for controlling the operation of the motor.

In my apparatus for controlling elevators there is a safety-circuit connected between or across the mains and controlled from the car, which circuit in turn controls circuits in parallel thereto, and the said parallel circuits include electroreceptive devices controlling the operation of the relays and starting-switch or the motor-starting devices. The safety-circuit is normally open, and the parallel circuits are normally open, but include normally closed contacts adapted to prevent interference after the motor has started. The safety-circuit includes a safety-magnet which controls circuits, including controlling-magnets, which in turn control the motor-starting devices. The said safety-circuit also includes an electromagnet for operating normally open contacts of the parallel circuits, the parallel circuits including, in addition to these contacts and the normally closed contacts, other normally open contacts controlled from the car, and the electroreceptive devices or controlling-magnets in the parallel circuits control the relay-circuits, including a winding of the safety-magnet—namely, the stronger winding which operates to initially open the normally closed contacts of the interference-switch. The normally open safety-circuit controls normally open contacts of the parallel circuits, which may be termed the "second" circuit, and it will be seen that the controlling magnets of the second circuit control what may be called a "third" circuit, which includes the relays, and since the safety-magnet includes windings in both the safety-circuit and this third circuit the contacts controlled by the safety-magnet may be said to be controlled by both the first or safety and third circuits, or, in other words, the normally closed contacts are controlled by the joint operation of said safety-circuit and a third circuit, which third circuit is controlled by devices in the second circuit. The safety-circuit is pneumatically controlled from the car and controls the circuits in parallel thereto, including controlling devices and also normally open and normally closed switches, the normally open switches also being pneumatically operated from the car. The pneumatically-controlled safety-circuit between the mains may also be said to control, in conjunction with pneumatic means, circuits in parallel with the safety-circuit, which parallel circuits include the electroreceptive devices or electromagnets controlling the starting and reversing switch of the motor.

Without limiting myself to the precise construction and arrangement of parts shown, I claim as my invention—

1. In a controlling apparatus for elevators, the combination with a motor, car, and stations, of pneumatic devices and connections for calling and sending the car from one station to another operating in conjunction with electrical motor-controlling means, substantially as described.

2. In an apparatus for controlling elevators, the combination with a motor, and its electrical controlling means, of a pneumatically-controlled floor-controller connected to said controlling means, substantially as described.

3. In an apparatus for controlling elevators, the combination with a motor, and its reversing-switch, of a pneumatically-controlled floor-controller connected to said reversing-switch, substantially as described.

4. In an apparatus for controlling elevators, the combination with a motor, car, and stations, of electrical controlling means for the motor, a floor-controller connected to said controlling means, and pneumatic means connected to the car and stations for controlling the operation of the floor-controller, substantially as described.

5. In an apparatus for controlling elevators, the combination with a motor, car, and stations, of electrical controlling means for the motor, a floor-controller connected to said controlling means, and pneumatic means connected to the stations for controlling the operation of the floor-controller, substantially as described.

6. In an apparatus for controlling elevators, the combination with a motor, car, and stations, of electrical controlling means for the motor, a floor-controller connected to said controlling means, and pneumatic means connected to the car for controlling the operation of the floor-controller, substantially as described.

7. The combination with a motor, car, and stations, of electrical controlling means for the motor controlled by pneumatic means connected to the car and stations, substantially as described.

8. The combination of stations, a car, an electric motor for operating the same, and pneumatic means connected to the car and stations for controlling said motor, substantially as described.

9. In an elevator, the combination with a motor, car, and stations, of electrical controlling means for the motor controlled by pneumatic means connected to the stations, substantially as described.

10. The combination with a motor, car, and stations, of electrical circuits, switches therein controlling said motor, and pneumatic means connected to the car for controlling the operation of said switches, substantially as described.

11. In an apparatus for controlling elevators, the combination with a motor, car, and stations, of controlling means for the motor, pneumatic devices for the floors or stations, pneumatic devices on the car corresponding to the floors or stations, pneumatic connections between the devices on the car and the corresponding devices at the stations, and common pneumatic connections therefrom to said motor-controlling means, substantially as described.

12. In an apparatus for controlling elevators, the combination with a motor, of a reversing-switch, a floor-controller, circuits connected to the floor-controller and switch, and pneumatic operating devices and connections for controlling said circuits, substantially as described.

13. In an apparatus for controlling elevators, the combination with a motor, car, and stations, of a reversing-switch for the motor, a floor-controller, circuits connecting the floor-controller and reversing-switch, and pneumatic operating devices and connections connected to the floors or stations and car for controlling said circuits, substantially as described.

14. In an apparatus for controlling elevators, the combination with an elevator-motor, of pneumatic push-buttons for the floors or stations, pneumatic push-buttons on the car corresponding to the several floors or stations, with pneumatic connections including the push-buttons and the controlling devices of the motor for controlling the operation of the motor, substantially as set forth.

15. In an apparatus for controlling elevators, the combination with an elevator-motor, of a set of pneumatic push-buttons for the floors or stations, a set of pneumatic push-buttons on the car corresponding to the several floors or stations with pneumatic connections including the push-buttons and the controlling devices of the motor for controlling the operation of the motor, and means for preventing the subsequent control of the motor from one set of push-buttons after it has been operated from the other set, substantially as set forth.

16. In an apparatus for controlling elevators, the combination with an elevator-motor, of pneumatic push-buttons for the floors or stations, pneumatic push-buttons on the car corresponding to the several floors or stations, with pneumatic connections including the push-buttons and the controlling devices of the motor for controlling the operation of the motor, and means for preventing the subsequent control of the motor from a floor or station after it has been operated from the car and stopped, substantially as set forth.

17. In an apparatus for controlling elevators, the combination with a motor for operating the car in either direction, of a pneumatic push-button for each floor or station, pneumatic push-buttons on the car corresponding to the several floors or stations, controlling circuits and devices for the motor, and pneumatic controlling connections between the push-buttons and the controlling devices of the motor, so arranged that when any push-button is operated, circuits are completed and the motor operated to bring the car to the station corresponding to the push-button, substantially as set forth.

18. In an apparatus for controlling elevators, the combination with a motor for operating the car in either direction, a pneumatic push-button for each floor or station, pneumatic push-buttons on the car corresponding to the several floors or stations, controlling circuits and devices for the motor, and pneumatic controlling connections between the push-buttons and the controlling devices of the motor, so arranged that when any push-button is operated, the controlling-circuits are completed and the motor operated to bring the car to the station corresponding to the push-button, and means for preventing subsequent interference with the operation of the motor after it is started, substantially as set forth.

19. In an apparatus for controlling elevators, the combination with the motor for operating the car in either direction, of a pneumatic push-button for each floor or station, pneumatic push-buttons on the car corresponding to the several floors or stations, controlling-circuits and devices for the motor, and pneumatic controlling connections between the push-buttons and the controlling devices of the motor, so arranged that when any push-button is operated, the controlling-circuits are completed and the motor operated to bring the car to the station corresponding to the push-buttons, and means for preventing the subsequent control of the motor from a floor or station, both before and after the motor has come to rest, after it has been operated from the car, substantially as set forth.

20. In an elevator, a controlling device comprising a flat contact-strip connected to a moving part of the apparatus and having an insulated portion, contacts movable relative to the strip in a direction substantially perpendicular thereto, means for causing said contacts to impinge directly upon said strip, means for withdrawing them out of contact therewith, and for normally holding them out of contact, and auxiliary means for moving said contacts out of contact with the strip, in case contact is not promptly broken, substantially as set forth.

21. In an elevator, a control device comprising a flat contact-strip having an insulated portion, contact-pieces movable relative to the strip in a direction substantially perpendicular thereto, normally out of contact therewith but adapted to impinge directly thereon, means for moving said contact-pieces into contact with the strip, and means on the strip for breaking contact in case of emergency, substantially as set forth.

22. In an elevator, a floor controller or controlling device comprising a contact-strip connected to a moving part of the apparatus and having an insulated portion, armatures having contacts movable relative to the strip in a direction substantially perpendicular thereto, normally out of contact therewith, but adapted to impinge directly thereon, electromagnets controlling the operation of said armatures, and auxiliary means on the strip for breaking contact, substantially as set forth.

23. In an elevator, a floor controller or controlling device comprising a contact-strip connected to a moving part of the apparatus and having an insulated portion, armatures having contacts movable relative to the strip in a direction substantially perpendicular thereto, normally out of contact therewith, but adapted to impinge directly thereon, electromagnets controlling the operations of said armatures, and auxiliary circuit-breaking means consisting of hubs on the strip for moving the contacts out of contact with the strip, substantially as set forth.

24. In an apparatus for controlling elevators, the combination with the car, the motor and supply-mains therefor, of a safety-circuit between the mains controlled from the car, and in turn controlling circuits, in parallel to said safety-circuit, the said parallel circuits including electroreceptive devices controlling the operation of the motor-starting devices, substantially as set forth.

25. In an apparatus for controlling elevators, the combination with the car, the motor and supply-mains, of a normally open safety-circuit controlled from the car, and controlling normally open circuits containing controlling devices and normally closed contacts adapted to prevent interference after the motor has started, said controlling devices controlling circuits including the motor-starting devices, substantially as set forth.

26. In an apparatus for controlling elevators, the combination of the car, its operating-motor and supply-mains therefor, of a safety-circuit between the mains controlled from the car and including a safety-magnet, circuits, including controlling-magnets, controlled by said safety-magnet, and circuits including motor-starting devices controlled by said controlling-magnets, substantially as set forth.

27. In an apparatus for controlling elevators, the combination of the car, its operating-motor and supply-mains therefor, of a safety-circuit between the mains controlled from the car and including a safety-magnet and a circuit-closing magnet, circuits, controlled by said safety and circuit-closing magnets, said circuits including controlling-magnets controlling the starting and stopping and direction of rotation of the motor, substantially as set forth.

28. In an apparatus for controlling elevators, the combination with the car, its operating-motor and supply-mains, of a normally open safety-circuit controlled from the car, said safety-circuit including an electromagnet for operating normally open contacts of parallel circuits, the said parallel circuits including normally closed contacts and other normally open contacts controlled from the car and also including electroreceptive devices, said safety-circuit including one winding of a safety-magnet controlling the operation of the normally closed contacts of said parallel circuits, and circuits controlled by said electroreceptive devices, in parallel to said parallel circuits and including another winding of said safety-magnet and the devices for starting the motor and for controlling its direction of rotation, substantially as set forth.

29. The combination with an elevator-car, its operating-motor and supply-mains, of a normally open circuit controlling normally open contacts of a second circuit including other normally open contacts and normally closed contacts and also including controlling devices controlling a third circuit containing the motor-starting devices, said normally closed contacts being controlled by both the first and third circuits, substantially as set forth.

30. The combination with an elevator-car, its operating-motor and controlling-circuits, of a normally open safety-circuit controlling a second normally open circuit in parallel thereto including controlling devices and normally closed contacts, said normally closed contacts being controlled by the joint operation of said safety-circuit and a third circuit controlled by said controlling devices, substantially as set forth.

31. In an apparatus for controlling elevators, the combination with a car and its motor, of controlling means for the motor comprising a circuit controlling a second circuit in parallel thereto, said second circuit including normally closed contacts and controlling devices controlling a third circuit bridging said normally closed contacts, and means included in both the first and third circuits for controlling said normally closed contacts of the second circuit, substantially as set forth.

32. In an apparatus for controlling elevators, the combination with the car, its motor and supply mains, of a safety-circuit, a circuit controlled thereby and including controlling-switches and devices controlling the starting and stopping of the motor, and means for cutting said controlling-switches out of circuit after the motor has started to prevent interference, substantially as set forth.

33. In an elevator-controlling apparatus, the combination with the car and electric motor and its connections, of a safety-circuit, a circuit controlled thereby and including normally closed contacts and also including controlling-switches and devices controlling the starting and stopping of the motor, and means for opening said normally closed contacts to cut out said controlling-switches to prevent interference, substantially as set forth.

34. In apparatus for controlling elevators, the combination with the elevator-motor and its connections, of a safety-circuit, a circuit controlled thereby and including normally closed contacts and also including controlling-switches and devices controlling other circuits including the starting devices of the motor, and means controlled by said other circuits and the safety-circuit, for operating the normally closed contacts to cut out the controlling-switches after the car has started, to prevent interference, substantially as set forth.

35. In an apparatus for controlling elevators, the combination with the car, its motor and electrical connections therefor, of a circuit including normally open switches, also normally closed contacts and controlling devices, a safety-circuit containing means for maintaining said normally closed contacts open after they have been initially opened, and circuits controlled by said controlling devices including motor-operating devices and also including means for initially opening said normally closed contacts thereby preventing interference, substantially as set forth.

36. In an electropneumatic apparatus for controlling elevators, the combination with a car and its motor, of a pneumatically-controlled safety-circuit which controls circuits including controlling devices and also normally open and normally closed switches, pneumatic means for operating said normally open switches, other circuits including motor-controlling means controlled by said controlling devices, and means included in the safety-circuit and said other circuits for operating said normally closed switch to prevent interference, substantially as set forth.

37. In an electropneumatic apparatus for controlling elevators, the combination with the car and its motor, of a pneumatically-controlled safety-circuit, controlling-circuits containing controlling devices and also normally open and normally closed switches, pneumatic means for operating said normally open switches, other circuits including motor-controlling means, controlled by said controlling devices, and means in said other circuits for initially opening said normally closed switch, and means in the safety-circuit for maintaining it open after the car has stopped, substantially as set forth.

38. The combination with the car, stations, motor and its controlling devices, of a set of pneumatic push-buttons on the car, a set of pneumatic push-buttons for the floors or stations, pneumatic connections between the push-buttons and motor-controlling devices, and means in said connections for preventing an impulse from one of a set of buttons reaching those of the other set, substantially as set forth.

39. The combination with the car, stations, motor and its controlling devices, of a set of pneumatic push-buttons on the car, a set of pneumatic push-buttons for the floors or stations, pneumatic connections between the push-buttons and motor-controlling devices, and valves in said connections for preventing an impulse from one set of buttons reaching those of the other, substantially as set forth.

40. In an elevator, the combination with the car and motor, of controlling-circuits for the motor, and mechanical means connecting the well-doors for controlling said controlling-circuits, substantially as set forth.

41. In an elevator, the combination with the car and motor, of controlling-circuits for the motor, and mechanical means connecting the well-doors whereby when any door is opened the circuit is broken, substantially as set forth.

42. In an elevator, the combination with the car and motor, of controlling-circuits for the motor, a switch in the controlling-circuits, and mechanical means connecting said switch and the well-doors, whereby when any door is opened and closed the controlling-circuit is broken and made, substantially as set forth.

43. In an elevator, the combination with a car and motor, of controlling-circuits for the motor, a switch in the controlling-circuits, and mechanical connection between said switch and the well-doors whereby when any door is opened the controlling-circuit is broken, substantially as set forth.

44. In an elevator, the combination with the car and motor, of controlling-circuits for the motor, a switch in the controlling-circuits, and means connecting said switch with the well-doors whereby when any door is opened, the controlling-circuit is broken, substantially as set forth.

45. In an elevator, an electrical controlling device for determining the travel of the car, comprising a contact-piece connected to a moving part of the apparatus, an insulated portion on said contact-piece, a plurality of contacts adapted to impinge upon said contact-piece, and means for regulating the length of time a contact is in electrical connection with the contact-piece, substantially as set forth.

46. In an elevator-control apparatus, an electrical controlling device for determining the travel of the car comprising a contact-piece moving proportionately to the travel of the car and connected to the motor-controlling circuits, a plurality of contacts corresponding to a floor or station, adapted to make contact with the contact-piece and also connected to the motor-controlling circuits, and means for regulating the length of time electrical connection is maintained between a contact and the contact-piece, substantially as described.

47. In an electropneumatic apparatus for controlling elevators, the combination with the car, the motor and supply-mains therefor, of a pneumatically-controlled safety-circuit between the mains, in turn controlling in conjunction with pneumatic means, circuits in parallel with said safety-circuit, said parallel circuits including electroreceptive devices controlling the operation of the motor-starting devices, substantially as set forth.

48. In an electropneumatic apparatus for controlling elevators, the combination with the car, the motor and supply-mains, of a normally open safety-circuit controlled by pneumatic means, normally open circuits jointly controlled by pneumatic means and by said safety-circuit, the said normally open circuits containing controlling devices and also normally closed contacts adapted to be opened after the motor has started to prevent interference, and the said controlling devices controlling circuits including the motor-starting devices, substantially as set forth.

49. In an apparatus for controlling elevators, the combination with the car, the motor and supply-mains, of a safety-circuit across the mains, and means for controlling the same, the said safety-circuit controlling normally open circuits including controlling devices and normally closed contacts for preventing interference after the motor has started, and the said controlling devices controlling circuits including the motor-starting devices, substantially as set forth.

50. In an apparatus for controlling elevators, the combination with the car, the motor and supply-mains therefor, of a safety-circuit between the mains, means for controlling the same, the said safety-circuit in turn controlling circuits in parallel with the same, and the said parallel circuits including electroreceptive devices controlling the operation of the motor, substantially as set forth.

51. In an electropneumatic apparatus for controlling elevators, the combination with the car, the motor and supply-mains, of a safety-circuit across the mains controlled by pneumatic means from the car, normally open circuits jointly controlled by pneumatic means from the car and said safety-circuit, the said normally open circuits containing controlling devices and also containing normally closed contacts adapted to prevent interference after the motor is started, and the said controlling devices controlling circuits including the motor-starting devices, substantially as set forth.

52. In an electropneumatic device for controlling elevators, the combination of the car, its operating-motor and supply-mains therefor, of a safety-circuit controlled by pneumatic means and including a safety-magnet, circuits including controlling-magnets jointly controlled by pneumatic means and said safety-magnet, and circuits including motor-starting devices controlled by said controlling-magnets, substantially as set forth.

53. In an electropneumatic apparatus for controlling elevators, the combination with the car and its operating-motor and supply-mains therefor, of a safety-circuit controlled pneumatically from the car and including a safety-magnet and a circuit-closing magnet, and circuits jointly controlled by pneumatic means and by said safety and circuit-closing magnets, the said circuits including controlling-magnets controlling the operation of the motor, substantially as set forth.

54. In an electropneumatic apparatus for controlling elevators, the combination with the car, its operating-motor and supply-mains, of a normally open safety-circuit pneumatically controlled from the car, said safety-circuit including an electromagnet for operating normally open contacts of parallel circuits, the said parallel circuits including normally closed contacts and other normally open contacts controlled pneumatically from the car and stations, and also electroreceptive devices, said safety-circuit also including one winding of a safety-magnet controlling the operation of the normally closed contacts of said parallel circuits, and circuits controlled by said electroreceptive devices, in parallel with said parallel circuits and including another winding of said safety-magnet and the devices for starting the motor and for controlling its direction of rotation, substantially as set forth.

55. The combination with an elevator-car, its operating-motor and supply-mains, of a normally open pneumatically-controlled circuit controlling normally open contacts of a second circuit including other normally open pneumatically-controlled contacts and normally closed contacts and also including controlling devices controlling a third circuit containing the motor-starting devices, the said normally closed contacts being conjointly controlled by both the first and third circuits, substantially as set forth.

56. The combination with an elevator-car, its operating-motor and controlling-circuits, of a normally open pneumatically-controlled safety-circuit controlling a second circuit in parallel thereto including normally open pneumatically-controlled contacts, controlling devices and normally closed contacts, the said normally closed contacts being controlled by the joint operation of said safety-circuit and a third circuit controlled by said controlling devices, substantially as set forth.

57. In an electropneumatic apparatus for controlling elevators, the combination with the car, its motor and electrical connections therefor, of a circuit including normally open switches, also normally closed contacts and controlling devices, pneumatic means for controlling the said normally open switches, a pneumatically-controlled safety-circuit containing means for maintaining said normally closed contacts open after they have been initially opened, and circuits controlled by said controlling devices including motor-operating devices, and also including means for initially opening said normally closed contacts, thereby preventing interference, substantially as set forth.

58. In an apparatus for controlling elevators, the combination with the motor for operating the car, of controlling-circuits and connections including a reversing-switch and a floor-controller, the floor-controller comprising a flat contact connected with the moving part of the apparatus, and having an insulated portion, contacts adapted to impinge upon said flat contact and to be withdrawn therefrom, and means for actuating said contacts, substantially as set forth.

59. In an apparatus for controlling elevators, the combination with the motor for operating the car, of controlling-circuits and connections including a reversing-switch and a floor-controller, said floor-controller comprising a movable contact having an insulated portion, normally open contacts adapted to be brought into electrical connection with said movable contact and to slide thereon, and means for actuating said contact, substantially as set forth.

In testimony whereof I have signed my name to this specification in the presence of two subscribing witnesses.

AUGUST SUNDH.

Witnesses:
H. R. MARSDEN,
CHARLOTTE MACBRIDE.

Correction in Letters Patent No. 693,184.

It is hereby certified that in Letters Patent No. 693,184, granted February 11, 1902, upon the application of August Sundh, of Yonkers, New York, for an improvement in "Electropneumatic Control Systems for Elevators," an error appears in the printed specification requiring correction, as follows: In line 83, page 9, the words "plurality of contacts" should read *contact;* and that the said Letters Patent should be read with this correction therein that the same may conform to the record of the case in the Patent Office.

Signed, countersigned, and sealed this 25th day of February, A. D., 1902.

[SEAL.]

F. L. CAMPBELL,
*Assistant Secretary of the Interior.*

Countersigned:
F. I. ALLEN,
*Commissioner of Patents.*